(12) United States Patent
Bunker

(10) Patent No.: US 6,640,937 B2
(45) Date of Patent: *Nov. 4, 2003

(54) SLIDABLE BRAKE DISC SYSTEM

(75) Inventor: Kenneth J. Bunker, Leicester (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/884,197

(22) Filed: Jun. 19, 2001

(65) Prior Publication Data

US 2002/0038742 A1 Apr. 4, 2002

Related U.S. Application Data

(63) Continuation of application No. 09/303,183, filed on Apr. 30, 1999, now Pat. No. 6,247,560, which is a continuation-in-part of application No. PCT/GB97/03388, filed on Dec. 8, 1997, and a continuation-in-part of application No. PCT/GB97/03386, filed on Dec. 8, 1997.

(51) Int. Cl.[7] .................................................. B60T 1/06
(52) U.S. Cl. ..................................... 188/18 A; 188/71.5
(58) Field of Search .............................. 188/18 A, 71.5, 188/83.38, 218 XL, 264 A, 264 AA

(56) References Cited

U.S. PATENT DOCUMENTS

| | | | | |
|---|---|---|---|---|
| 4,576,257 A | * | 3/1986 | Carre | 188/73.32 |
| 4,598,799 A | * | 7/1986 | Thioux | 188/71.5 |
| 5,069,314 A | * | 12/1991 | Madzgalla et al. | 188/73.36 |
| 6,247,560 B1 | * | 6/2001 | Bunker | 188/18 A |
| 6,371,250 B1 | * | 4/2002 | Bunker | 188/18 A |

* cited by examiner

Primary Examiner—Christopher P. Schwartz
(74) Attorney, Agent, or Firm—Scott A. McBain

(57) ABSTRACT

An axially, slidable brake disc system employs leaf springs between a hub of a suspension casting or knuckle to float the brake discs for axial sliding movement, while holding the discs against wobbling, and employs brake pads which are biased by springs to float on a stationary bridge so that the contact between the brake pads and discs is a light random contact thereby resulting in reduced residual torque drag and disc thickness variation. The rotating brake discs will shift axially, slightly from the braking position to the off-brake position with the brake pads urged by their spring forces to keep their pad faces parallel to and slightly spaced from adjacent brake disc surfaces to prevent corner engagement and localized rubbing contact thereby reducing pad wear, residual drag torque and disc thickness variation. The brake force applicator may be mounted at a 12:00 position and in an integral bore in the suspension knuckle to reduce the size, weight, and space envelope of the braking system. Less braking pressure is needed with two brake discs and four brake pads and the system will pass the AMS fade test.

16 Claims, 12 Drawing Sheets

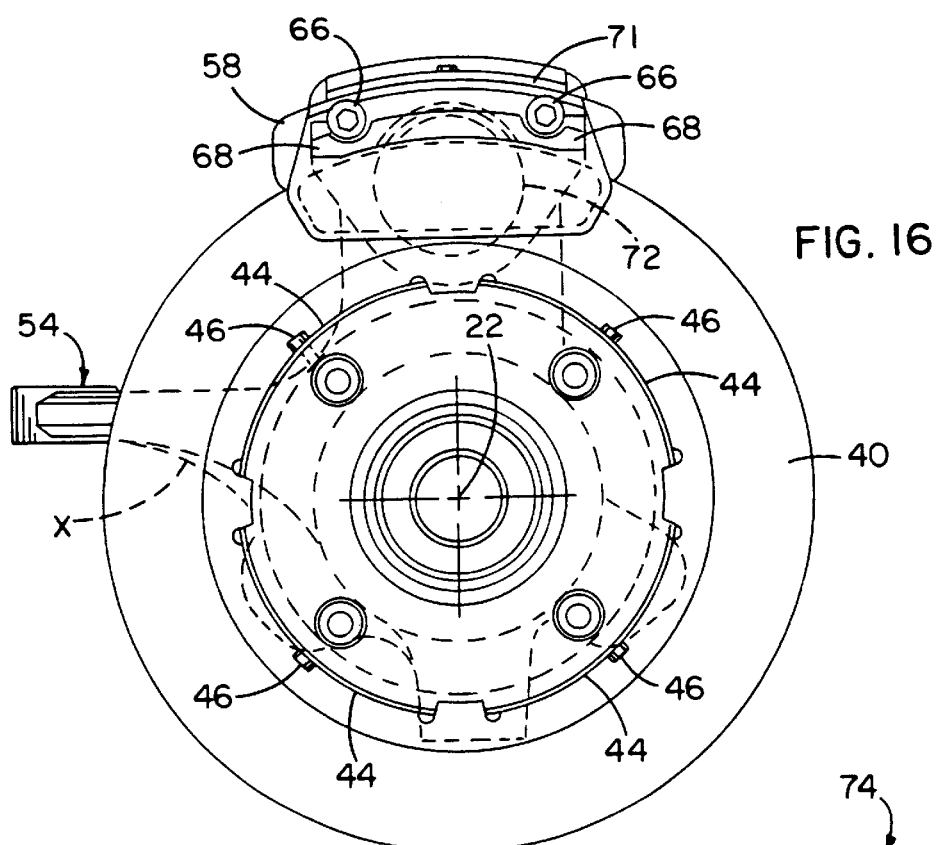
FIG. 16
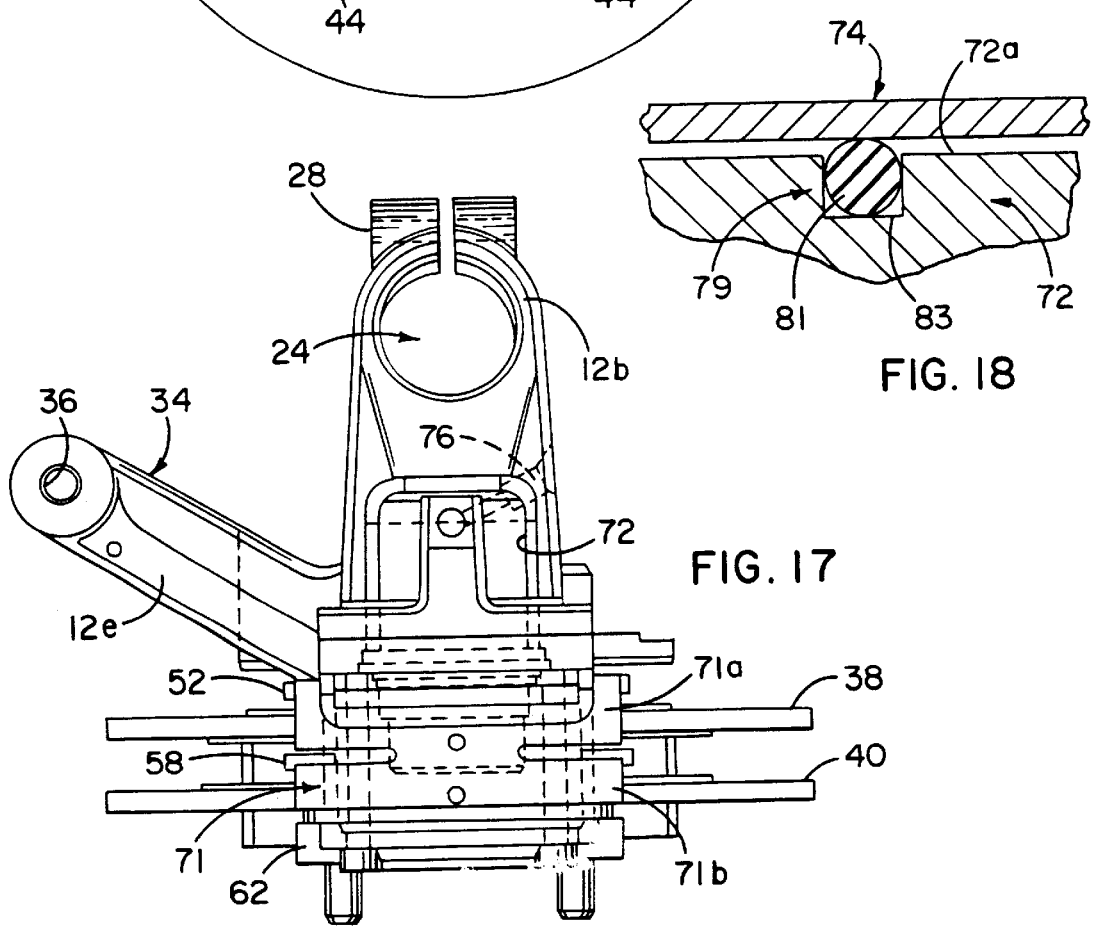
FIG. 18
FIG. 17

SLIDABLE BRAKE DISC SYSTEM

This application is a continuation of application Ser. No. 09/303,183, filed Apr. 30, 1999, now U.S. Pat. No. 6,247,560, which is a continuation-in-part of PCT application, Application No. PCT/GB97/03388; filed Dec. 8, 1997, designating the United States and a continuation-in-part of PCT application, Application No. PCT/GB97/03386 filed Dec. 8, 1997, designating the United States. PCT applications PCT/GB97/03388 and PCT/GB97/03386 are hereby incorporated herein by reference in their entirety.

BACKGROUND OF THE INVENTION

This invention relates to a disc brake system and, more particularly, to a disc brake system for use on production vehicles.

Currently, production vehicles such as automobiles often have spot-type disc brakes, having a fixed brake disc and a caliper configuration with an inboard piston and cylinder operated by hydraulic fluid. The caliper is bolted to a suspension member either forward or rearward with respect to a vertical plane through a wheel axle and includes a slidable bridge sliding on pins with an outer brake pad on the outboard end of the bridge. Operation of the brake pedal forces the piston outwardly to engage and to slide an inner brake pad along the bridge into frictional braking engagement with the inner side of the fixed disc, which is rigidly fixed to a hub on which the wheel is mounted. A reaction force on the slidable bridge causes it to slide on the pins and force the outer brake pad tightly against the outer side of the fixed brake disc. Deceleration of the clamped disc and its associated hub and its attached wheel thereby decelerates the vehicle. As the piston is forced to slide to engage the brake pads with the fixed disc, an internal O ring seal between the cylinder and the piston is compressed, and energy is stored therein which is released, when the braking fluid pressure is relieved, to slide the piston in the reverse direction to its off brake position in the cylinder.

This conventional disc brake hereinafter called a "conventional, fixed disc brake" because its brake disc is fixed to the wheel hub. In contrast thereto, there is disclosed in the patent literature, such as U.S. Pat. Nos. 4,844,206 and 4,576,255; U.K. patent application 2 184 801; and South African published application 70/5340, a pair of slidable brake discs that slide axially along a wheel hub and utilize a fixed bridge with a fixed brake pad at a distal end of the bridge; and a hydraulic piston that slides the brake discs and slidable brake pads outwardly to bring an outer side of the outer brake disc into braking engagement with the distal, fixed brake pad. The fixed disc brake system is widely used, particularly to brake the front wheels while the slidable brake disc system is not currently in use on production vehicles. In order to be used on vehicles, any brake system must meet a long list of demanding specifications, some of which are explained herein. Until now, slidable brake disc systems appear to be unable to meet the rigorous, demanding criteria to the satisfaction of automobile manufacturers or suppliers. Vehicle manufacturers and brake suppliers undertake the risk of product liability lawsuits or product recalls and, therefore, are reluctant to adopt a new braking system unless it has superior qualities such as improved cost, weight, efficiency, longevity or other qualities relative to the standard fixed disc brake.

The current fixed brake disc systems used on vehicles are quite heavy and a reduction in weight is a desirable goal for the slidable disc brake system. In the fixed brake, the sliding bridge is quite large and heavy as are the bolts to bolt the caliper unit to the suspension member and heavy slide pins are used to support the slidable bridge. The typical brake disc itself is also quite heavy with its bell or hat shape and with its annular rim for engaging the brake pad.

Weight of the fixed brake disc system is detrimental not only to fuel efficiency but also to steering. That is, the brakes represent an unsprung mass on the wheel that must be turned and steered and that also must be supported to withstand high loads including the brake torque and loads due to a wheel going up and down as it travels over uneven road surfaces. The overall size of the fixed, disc brake and its location on the vehicle suspension requires a large space envelope that limits the locking angle and vehicle turning circle, particularly for some types of wheel suspensions.

In addition to size, cost and weight, there are the criteria of efficiency, proficiency and longevity. Brake wear is a longevity problem and a longer brake pad life and brake disc life are desired by vehicle manufacturers which are increasingly providing long term service warranties for their vehicles, as well as for the vehicle owner who ultimately pays for brake replacement in one manner or the other. The brake disc life can be adversely affected by a localized, rubbing contact between the brake pads and the brake pad, particularly at the brake-off position of the braking system. If the brake disc is tilted from a true, vertical plane normal to a horizontal axis through the hub, an increased localized rubbing contact of brake pads on the disc results and is a source of disc thickness variation (DTV), i.e., a different thickness in cross-section of the fixed brake disc at different radial locations from the disc axis. Significant DTV results in vibrations that the driver feels and requires costly brake maintenance to eliminate the vibration problem.

Some fixed disc brake systems have noise problems which are cured to a certain extent by the addition of noise suppressors, which add to the size, weight and cost of the system. Brake systems must be free of rattles and should be free of noise. The current bell or hat shape of the conventional fixed brakes can be noisy because an impact on the disc causes a noise resonance and loud sound due to its bell shape and fixed attachment to the hub. Therefore, it is desirable to eliminate such a noisy shape and fixed mounting of the brake disc to the hub.

In addition to above, there also may occur a "feel" problem where the driver experiences a long or deep pedal depression when operating the brakes. Sometimes the deep pedal is the result of "knock back" of the actuator piston in the cylinder in the piston return direction that displaces hydraulic liquid and shifts the piston deeper in the cylinder. A cornering or bumps in the road may deflect the suspension or slidable brake caliper and knock back the piston and cause the vehicle operator to experience a deep pedal braking operation. Another potential source of "knock back" in the conventional sliding bridge, fixed brake disc system is the result of an initial large deflection of the outer distal end of the slidable bridge at heavy braking loads where the bridge distal end is often deflected 0.006 inch or more. The sliding bridges are already quite heavy and massive to withstand the braking torque and to provide the stiffness for the distal end of the bridge. When the brake pressure is released, the distal bridge end rebounds and can cause knock back of the piston in the cylinder.

Among the demanding temperature tests that vehicle brakes are subjected to is the Auto Motive Sport (AMS) fade test in which the brake temperature is monitored during ten braking stops as fast as possible over a very short time interval. In brief, the AMS vehicle test involves the driver flooring the gas pedal to accelerate vehicle extremely fast to 100 Kph. and then braking as hard as the driver can to stop the vehicle as quickly as it can be braked to a stop. This is quickly iterated for a total of ten rapid accelerations and decelerations with the temperatures of the brake disc being measured over the course of the ten cycles. It is desired to keep the maximum temperature of the brake disc below its "Judder" effect temperature at which severe disc geometry and metallurgical changes occur and deteriorate the brake disc. The Judder effect temperature is usually in the range of 650° to 700° C.; and this AMS test is difficult to pass. In that AMS test of a lightweight automobile having the fixed brake system (against which the slidable disc brake system of this invention is compared), the brake disc temperature exceeded 650° C. and the temperature drop between braking operations was only about 30° C. The test data described herein is from two identical, production model automobiles of B Class front wheel drive. They have a kerb weight of about 1000 Kgs. and a gross vehicle weight of about 1350 Kgs.

Manifestly, the test data for different vehicles may vary substantially from that described herein, which data is given for the purposes of illustration of one embodiment of the invention and is to be construed as a limitation for the invention as defined by the claims attached hereto.

Brake disc temperature also can be monitored to provide an indication of "off-brake" residual torque of the braking system. Even though the vehicle operator is not operating the braking pedal and is steering the vehicle along a straight line path, the brake pads are rubbing against the fixed brake and causing the temperature thereof to rise substantially above ambient. The cornering of a vehicle and sharp turning may also shift the slidable brake caliper into rubbing contact with the fixed brake disc. In a current production vehicle of lightweight and having a fixed brake system, the disc temperature was measured at least 35° C. above ambient when the ambient temperature is between 10° to 20° C. This is a good indication that current fixed brake systems have considerable residual torque at the off-brake condition, and concomitant wear and fuel energy waste. It will be recognized that the bell or hat shape of fixed brake disc has non-uniform cross-sectional thickness at the corners and has different fillets that can result in non-uniform expansion thereby causing an increase in the space envelope of the outer rim of the brake disc and resultant rubbing, thereby producing a high off-brake, residual torque.

In order to test conventional brakes when used in mountainous terrain having descending, steep grades with much cornering of the vehicle, a conventional disc brake was tested over thirty descents of a steep mountain with each descent lasting about twenty-four minutes. These fixed brakes discs on a lightweight, production car experienced temperature of over 600° C. after about 13 minutes of descent; and they reached a maximum temperature of almost 680° C. at the end of the run. Hence, there is a need for a disc brake system that runs cooler in such a test so that it does not potentially cause a Judder effect deterioration of the brake disc in mountainous usage. These fixed disc brakes had high brake fluid temperatures and poor standing soaking curves after trans-mountain runs.

It will be appreciated that in sliding brake disc system that brake disc must slide axially on the hub between an off-brake position, where the residual torque should be low and a braking position where the torque is high, and then return to the off-brake position to reduce the residual torque. The sliding connection between the brake disc and hub must be free to move despite being subjected to corrosive conditions and over a long period of use. The slidable brake disc must not be noisy or squeal under low and high temperature conditions, and it must not wobble or generate dust or produce vibrations that the driver can feel or hear. In the patent literature, such as U.K. patent application 2 184 802 and U.S. Pat. No. 4,576,255, the slidable brake disc systems had spline grooves oversized relative to the size of the disc teeth inserted into the grooves and spring devices where mounted on the hub to push the discs to rotate a driving side, flank of each tooth into mating engagement with a flank of the oversized spline groove. The oversized notches were used to prevent the previously heated and now cooled disc from jamming in the splines. To eliminate "knock back" and chattering, springs were inserted into the spline notches to bias the spline flanks on the disc and hub into engagement with one another. Such designs do not provide a good drive connection between the discs and the splined hub, are costly and apparently allow the discs to wobble relative to the hub at high braking loads.

From the foregoing, it will be seen that there is a need for a better, slidable disc mounting system that is more efficient and that does not generate noise or squeal as the brake discs expand at high temperatures and that does not wobble at high braking loads. Also, there is a need for a twin disc braking system that operates at low residual torque in an off-brake condition to reduce DTV and energy loss.

SUMMARY OF THE INVENTION

In accordance with the present invention there is provided a new and improved slidable disc brake system particularly adapted for use on production vehicles. This is achieved by the use of a unique mounting and control of the positions of the slidable brake discs and brake pads that results in low frictional face pad wear and a low, off-brake, residual torque and a good drive connection between the hub and the slidable brake disc.

The preferred construction uses force applicators such as leaf springs located between the hub and the brake discs to float the brake discs for axial sliding movement and to hold them against wobbling on the hub while allowing the brake discs to have light, random contact with the brake pads. The rotating brake discs will shift slightly in the axial direction on the hub from their brakes-on position to establish a brakes-off position. These rotating, floating discs also exert axially directed forces on the brake pads to slide them axially to their off-brake positions along the stationary bridge. The brake pads are constrained by force applicators such as leaf springs to keep their pad faces parallel to the brake discs and not to allow the brake pad faces to tilt into a corner engagement with the brake disc as would cause localized rubbing contact, thereby generating disc thickness variation in the brake discs and resultant vibration of the discs. That is, the spring holds the brake pad against tilting movements and axial sliding movements on the supporting bridge by vibration and inertia forces caused by operation of the vehicle. If allowed to tilt on the bridge, the pad faces experience a localized rubbing contact which increases the residual drag torque, pad wear and DTV at the off-brake position. The brake pads are preferably constrained by leaf springs to float on the bridge and the brake pads are constrained by leaf springs between the discs and hub to float on the hub so that the contact between the brake pads and discs is a light, random contact thereby resulting in reduced residual drag torque and disc thickness variation.

Preferably, the respective leaf spring forces applied to brake pads and the brake discs are balanced relative to one another so that the system can move from its braking condition to its off-brake position by action of separation forces between the discs and the braking pads; and yet, the brake pads are held in the off-brake position against tilting under vibration and vehicle caused inertial forces and thereby causing a localized rubbing and DTV. More specifically, in the case of a two-brake disc system, when shifting from the brakes on-condition to brakes off-condition, the outer brake disc slides axially on the hub to separate itself from the stationary, distal brake pad fixed to the bridge; and the central slidable brake pad between the first disc and the second disc slides axially along the bridge away from the first disc to separate its outer pad face from the facing side of the first disc. The second, inner brake slides axially along the hub toward the piston and cylinder assembly to separate itself from the inner pad face on the central brake pad. The inner slidable brake pad at the piston slides axially inward toward the piston and cylinder assembly to separate its outer friction face from a facing side of the second brake disc. The respective leaf springs on the bridge and on the hub are balanced to allow this separation and yet hold the brake pads and brake discs from tilting, as would cause DTV or from unwanted axial sliding engagement as would cause a high residual drag torque, under the vibration and vehicle inertial forces being experienced by an unsprung brake system.

The floating twin disc, slidable brake discs and floating brake pads of the present invention provide a brake system that passed the AMS fade test with temperatures significantly lower than the conventional disc brake tested which did not pass this test. These twin disc brakes had a maximum temperature of about 120° C. lower than the maximum temperature for the fixed brake which was in the Judder range. Also, the cooling of the twin disc brakes was about 80° C. between stops relative to a cooling of about only 30° C. between stops for the standard fixed brake. Also, very significant results were found in the temperature of the fixed brake disc and the slidable brake discs as the respective brake discs cooled after braking at 100 mph with the fixed brake temperature above ambient being at 3.5 times higher than slidable brake temperature above ambient. This shows that the twin disc, slidable brake has significantly lower drag torque. An objective of the invention is to reduce the drag torque to about 1 newton meter as compared with a tested 6.0 newton meter as compared to a conventional disc brake tested. Thus, the slidable, twin disc brake system of this invention was found to have improved operating characteristics relative to operating temperatures when compared to a standard, fixed disc brake system.

In the preferred embodiment of the invention described herein, a significant size and weight reduction are achieved relative with the twin slidable brake system of this invention relative to a conventional fixed disc brake system with its large sliding caliper. More specifically, an unsprung, weight reduction in excess of 2 Kgs. was achieved for each front wheel. This is a very significant weight reduction and has implications for fuel savings, suspension design, vacuum assists, steerability, etc. This weight saving of 2 Kgs. is relative to a lighter, solid, fixed brake disc; and relative to a heavier, ventilated fixed brake disc, the average saving may be as much as 3.6 Kgs. per front wheel. This is an unsprung weight reduction which is desired by production vehicle manufacturers.

In accordance with an important aspect of the invention, the brake cylinder is integrally formed in the suspension casting or knuckle above the axle on the vertical centerline. This integral suspension casting reduces the number of parts for the suspension and provides a more compact, and lighter weight system. The floating brake disc system does not knock back the piston during cornering or other dynamic movements as easily as the large sliding caliper standard disc brake. Also, the fixed bridge need not be large and heavy as the sliding caliper bridge which, even though large and heavy, deflects significantly under heavy braking loads by 0.006 inch, for example. These large sliding caliper disc brakes are usually mounted at about 3:00 o'clock or 9:00 o'clock positions rather than a preferred 12:00 o'clock position for the twin slidable disc brake of this invention. Also, the mounting of the bridge above the axle at the vertical centerline position allows an increase in steering angles and vehicle turning circle.

The unit cost reduction for the embodiment of the invention illustrated herein relative to a current fixed brake system for the same vehicle is estimated to be substantial and may approach 35% for the same vehicle. The slidable twin disc brake of this invention is designed to pursue the goals of substantial reduction in cost, weight, space envelope; increased longevity of brake pads; and better efficiency in manufacture, assembly and performance.

When the slidable disc brake is used with two slidable brake discs and four brake pads, such as on the front wheels of a production vehicle, the braking pressure needed may be about 50% of the braking pressure used today with the conventional systems using a fixed disc and two braking pads. Higher braking pressures applied to the brake disc usually can result in higher disc temperatures. The requirement for high brake pressures has resulted in the large-scale use of braking assists, such as vacuum assists and, in large commercial diesel trucks, the use of vacuum pumps to supply the vacuum for the brake assist system. The vacuum assists add weight and cost to the vehicle. The reduced braking pressure of this invention allows elimination of a vacuum assist system, in some instances, or the use of a smaller assist to generate the reduced brake pressure used in the slidable disc brake.

BRIEF DESCRIPTION OF THE DRAWINGS

FIG. 16 is a view taken in the direction of the arrow XVI in FIG. 6;

FIG. 17 is a view taken in the direction of the arrow XVII in FIG. 7; and

FIG. 18 is a fragmentary view of a sealing ring engaging a piston in a hydraulic cylinder.

DETAILED DESCRIPTION OF THE PREFERRED EMBODIMENT

Figure 1:
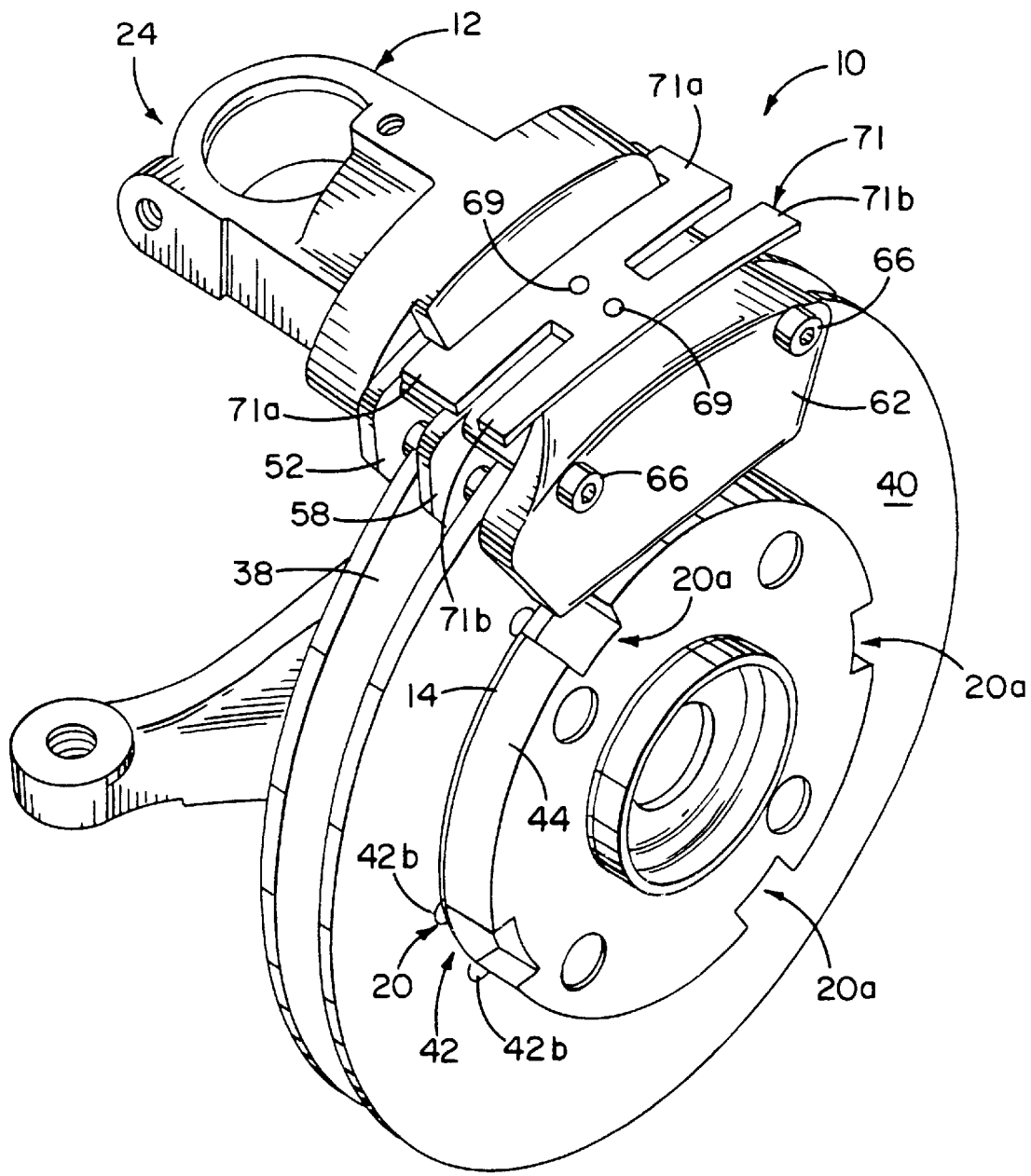
FIG. 1 is a perspective view of a slidable, twin disc brake assembly constructed in accordance with a preferred embodiment of the invention.

As shown in the drawings for purposes of illustration, the invention is embodied in a slidable disc brake assembly 10 which can have either one slidable braking disc 38 or two or more slidable braking discs such as a pair of brake discs 38 and 40 (FIGS. 1 and 2) illustrated herein for a front wheel drive car. In a front wheel drive automobile suspension and wheel assembly, as illustrated and described herein, the weight of the vehicle is concentrated at the front of the vehicle and more brake torque is applied to the front wheels than is applied to the rear wheels. It is contemplated that the rear wheel brake assembly will have only the single slidable disc; and a single pair of brake pads 50 and 60, while the front wheel brake assembly will have the second slidable disc 40 and additional brake pads 54 and 56 on a slidable, intermediate pad carrier 58. The present invention is directed to and claims a slidable disc brake system that can have one, two or more slidable discs and that can be used in other applications than automobiles.

Conventional disc brakes or production vehicles have a single, fixed brake disc (not illustrated) and a single pair of brake disc pads and this requires considerable pressure, such as 70 BAR, to be applied between the pads and the fixed disc to generate the required braking torque. This higher pressure requirement has resulted in the use of braking assists, such as a vacuum assist or a vacuum pump, to generate sufficient braking force. This adds cost and weight to the vehicle and necessitates higher pressure in the brake conduits and stronger and more expensive brake fluid lines to handle the high pressure. The use of the second slidable disc and a second pair of brake pads with a doubling of the engaged brake surfaces provides a braking assembly that works at 50% of the conventional pressure, e.g., 35 BAR. Higher pressure causes more wear and higher temperatures, and it is desirable to reduce pressures for these reasons alone. Thus, the second slidable disc enables the braking torque to be shared among four (4) engaged, friction surfaces instead of the conventional two—thereby reducing pressure, heat generation and wear.

As disclosed in the patent literature, there is a problem of rattling and noise generation encountered between the slidable brake discs and the supporting hub on which they slide. As described above, the discs may be heated to 300° C. to 600° C. when being subjected to extreme braking conditions such as cornering and braking down a mountain or when being subjected to the fast and repetitive braking and/or cornering as in the AMS test. These prior slidable twin disc systems were equipped with various spring devices mounted on the hub to push the discs to rotate and to abut a driving side flank of a disc spline tooth against an adjacent, mating flank driving slide flanks of a hub spline groove. The spline grooves in the hub were oversized relative to the size of disc teeth to prevent binding of the spline teeth in the spline grooves, and these oversized grooves allowed the discs to wobble at high braking pressures, as described in the aforesaid patent literature. When the braking pressure is released, the South African patent describes the use of release springs to push the brake disc axially along the hub. Axial directed spring pressures on the brake discs will increase the frictional off-brake, residual torque and should be avoided for this reason. It is a considerable problem to stabilize the slidable brake disc and yet allow the brake disc to slide freely at temperature extremes where the brake and the ambient temperatures are very low or very high after a considerable expansion of the disc particularly at its slidable driving connection to the colder hub. Also, the twin disc brake should have a lower off-brake, residual torque than that of the conventional fixed disc brake. Also, as explained above, for successful adoption by the automotive industry, the slidable twin disc brakes should meet the goals of a substantial reduction in cost, weight, space envelope; increased longevity of brake pads, and efficiency in manufacture, assembly and performance.

In accordance with the present invention, there is provided a slidable disc brake assembly having one or more brake discs 38, 40 which are mounted on a hub 14 of a suspension for a vehicle with the braking disc being constrained i.e., positioned on the hub 14, along its inner radial portion by a resilient radially directed force applicator 44 acting between the hub 14 and the brake disc and by an outer force applicator assembly 45 which is positioned at the outer rim of the disc. This construction provides a rotational geometry for the disc to have contact between the disc and the brake pads in a random nature, thereby resulting in a lower residual, off-brake torque and reduction of DTV. That is, a gentle random touching of the brake pads and brake disc may occur when driving straight ahead with the pads and disc being held in non-tilting positions relative to one another. The inner, radially directed, force applicator is positioned between the slidable disc, and the hub to provide friction forces to the hub and to the disc which holds them against sliding relative to one another and against generating a noise or a high squeal when the brake disc is heated and expanded. That is, when the brake disc was cold, no squeal or noise was generated at the spline interconnection. But, when the disc was heated and expanded, disc spline members or teeth 42 (FIG. 5) were loose and slid in hub splines 20 and generated high pitched squealing noises.

Figure 13:
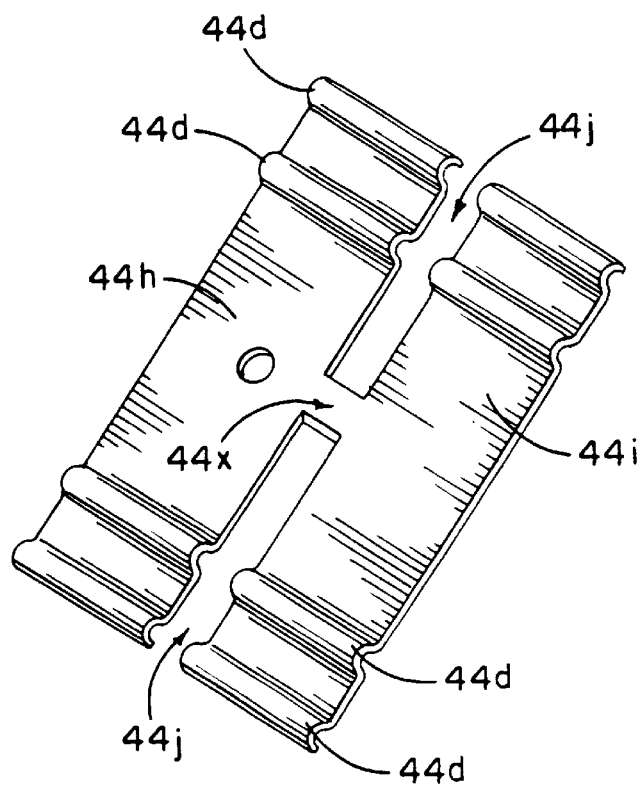
FIG. 13 is a perspective view of an alternative leaf spring having raised ribs thereon.
Figure 14:
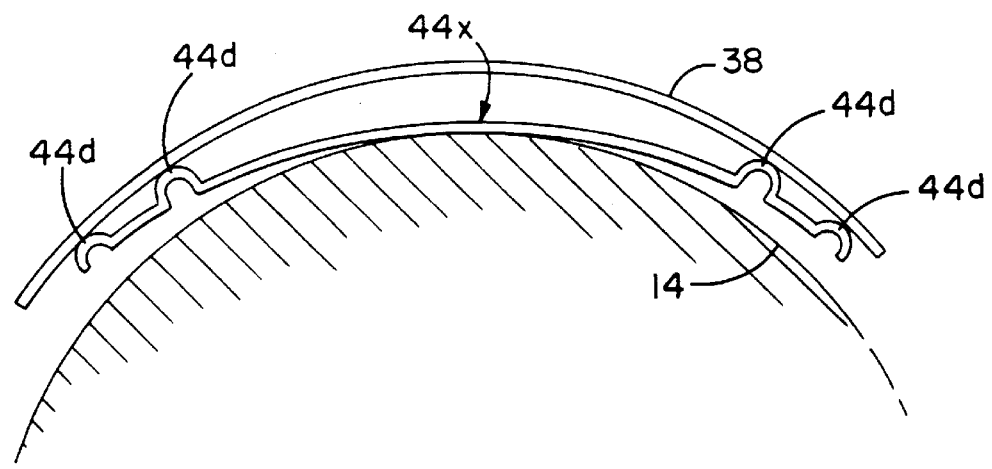
FIG. 14 is a diagrammatic, enlarged view of the points of contact between the leaf springs and the brake disc.

As will be explained in greater detail, the preferred radial, inner force applicator 44 comprises springs, preferably flat leaf springs 44a, that are laid tangentially of the hub at their centers 44b (FIGS. 4 and 5) and with their outer ends 44c biased into contact with inner hub surfaces at spaced points, as illustrated in exaggerated form in FIG. 4. More spaced points of contact can be provided by providing raised ribs 44d on the leaf springs 44x, as illustrated in FIGS. 13 and 14.

The slidable brake disc 38 is thus supported in a floating manner on points of contact 44c (FIG. 4) with the leaf springs 44a on the hub in a floating manner and the brake disc can be shifted axially with forces applied thereto to overcome the frictional forces being applied by the springs at inner disc hub surface. When the brake disc expands considerably due to a disc high temperature, the disc teeth become loose in the colder spline hubs and the frictional forces between the leaf springs 44a and the brake disc and hub restrain the disc from shifting relative to the hub and a resultant squealing noise. The leaf springs 44a impart radially directed forces to the inner hub portion of the brake disc to keep it generally in a plane normal to its rotational axis through the center of the hub. This inner radial positioning by the springs 44a assists in keeping the disc 38 concentric with the rotational axis and within a relatively tight space envelope at the brakes off condition thereby reducing rubbing contact between the brake pad's frictional surfaces and the brake discs 38, 40 and a resultant disc thickness variation (DTV). DTV which is a major source of vibration.

Figure 2:
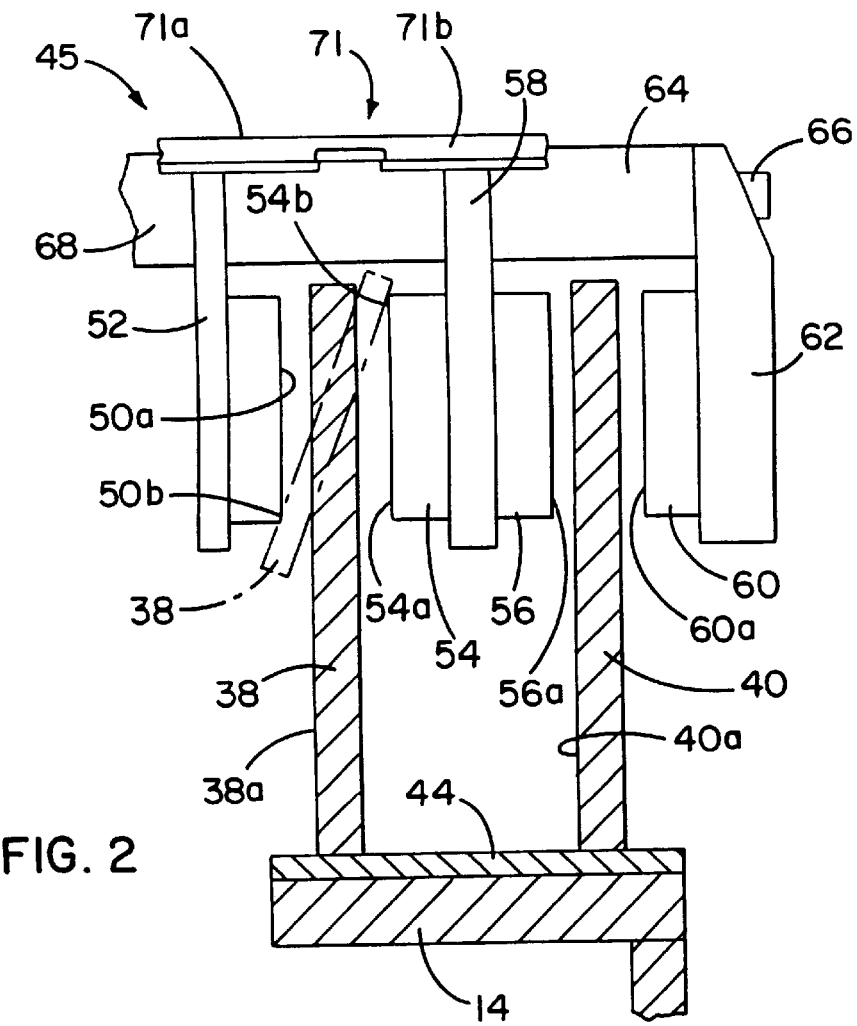
FIG. 2 is a diagrammatic view of an outer spring constraining the brake pads and an inner spring constraining the brake discs.
Figure 3:
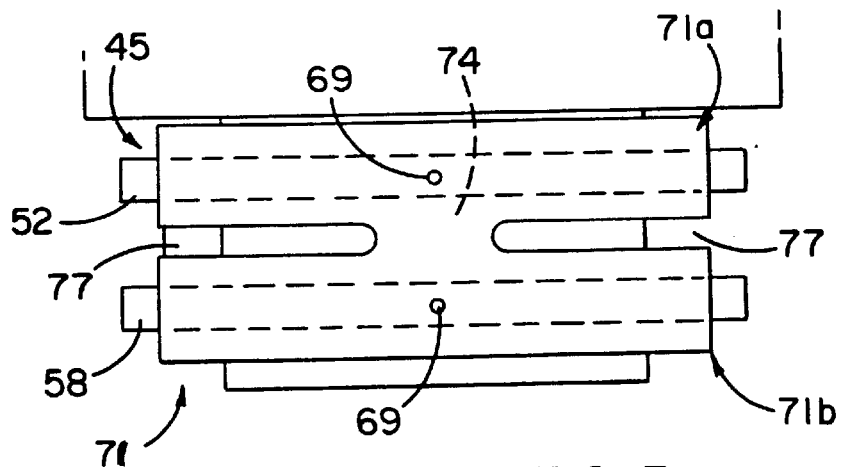
FIG. 3 is a plan view showing the spring constraining the brake pads.
Figure 3A:
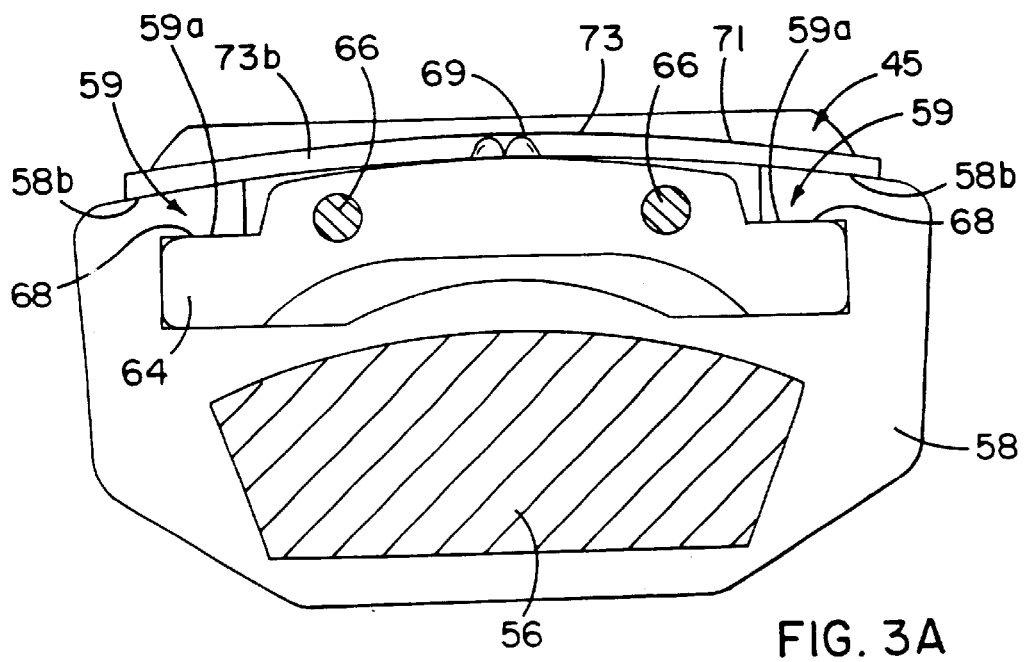
FIG. 3A is a cross-sectional view showing the spring applying restraining forces to the tops of the brake pad carriers.

In accordance with an important aspect of the invention, slidable brake discs 38 and 40 float on the hub 14 and its outer rim portion is constrained to its off-brake position, and each disc seeks or floats to an off-brake position established by engagement with slidable brake pads 50, 54 and 56, which slide on the guide surfaces 68 of the bridge-shaped guide member 64. As best seen in FIGS. 2, 3 and 3A, a brake pad, force applicator 71 is positioned to apply radially directed loads to the slidable brake pads to constrain them from sliding with predetermined spring forces. The spring forces are much stronger than that needed merely to prevent rattling or noise suppression. The spring forces are sufficient to restrain the slidable brake pads from moving into contact with the brake discs in an uncontrolled manner. It has been found that if only a light spring force is supplied to suppress noise, that the noise will be abated; but that the brake pads are free to shift and rub against the brake discs causing wear and DTV. Also, when using very light springs, the brake pads will not assist in positioning the outer rims of the slidable brake discs to reduce off-brake residual torque. The illustrated force applicator 71 comprises a pair of leaf springs 71a and 71b (FIGS. 2 and 5) which form the dual functions of preventing rattle and positioning of the pads and discs relative to each other.

After the brake has been applied and released, the rotating brake disc 38 initially rubs against the brake pads and forces from this rubbing cause the disc pads 50 and 56 to slide in opposite directions from the rotating disc. The amount of shifting is controlled by the brake force applicator's frictional force being overcome. Conversely, the off-brake, residual torque position of the rotating brake disc 38 is being constrained by the forced-apart brake pads, which are being held against further sliding by the force applicators. The force applicator springs 44 also are controlling any lateral sliding of the brake disc 38 along the hub. The brake disc 38 is being constrained in its off-load position by the outer force applicators acting on opposite sides of the pair of discs and the inner springs 44 acting on the inner hub portion of the discs. Thus, the disc is controlled to be free to slide and float but not to topple into the brake pads and the brake pads have controlled sliding but are not free to topple or to be free to vibrate into or bang against the discs.

Figure 8:
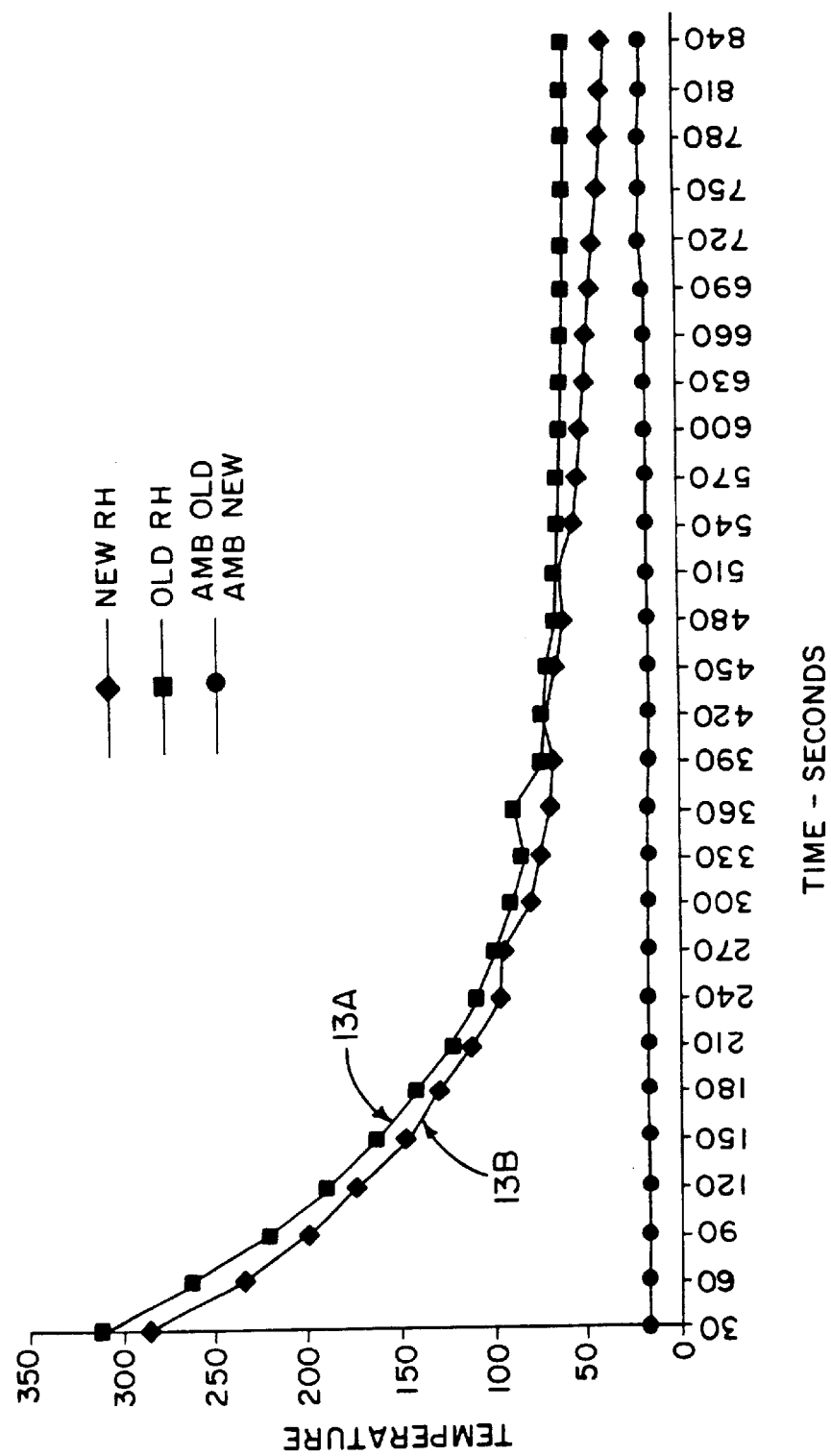
FIG. 8 shows temperature decay curves for disc brakes due to residual drag torque with the brakes off.

The twin disc brake assembly 10 of the present invention, because of its floating geometry as described above, has a significantly lower drag torque, i.e., off-brake residual torque, as will be explained in connection with FIG. 8 which illustrates a typical result for the disc temperature curves from 100 Kph. for a slidable, twin disc brake versus a conventional, fixed disc brake. The conventional fixed brake curves 13A plateaus at best is 35° C. above ambient while the slidable, twin disc brake 10 continues to cool and stabilizes at 10° above ambient, as illustrated by the straight line 13B. Usually, the conventional brake was found to be about 50°–70° C. above ambient. The assumption made with respect to this test is that dynamic drag due to disc face contact with the pad is proportional to temperature at the disc. The present invention is designed to preferably produce a low residual torque, e.g., about 1 newton meter or less in contrast to about 6 newton meter for the fixed disc brake on the vehicle being tested herein.

In accordance with the invention, the brake discs 38 and 40 must be flat and planar in their rotational plane and substantially normal to the rotational axis 9 (FIG. 2). The brake disc pads have outer planar surfaces 50a, 54a; 56a and 60a which are held by the springs 71a and 71b to be parallel to the disc annular braking surfaces 38a and 40a at the outer rim portion of the brake discs 38 and 40. When the disc geometry is slightly curved, i.e., not a flat planar surface, it has been found that localized rubbing and wear occurred, as illustrated in FIG. 2, at a lower corner 50b of the cylinder brake pads 50 and at the upper outer corner 54b of the opposed brake pad 54 on the slidable pad carrier 58. FIG. 2 shows a very exaggerated tilted disc 38 in lines to illustrate the point being made. The non-flat brake disc did not have random contact with the brake discs 38 and 40; but had localized rubbing contact due to the disc curvature at the inner and outer corners 50b and 54b during each or almost each revolution of the brake disc. Severe disc thickness variations resulted and vibrations of the brake occurred. When the non-flat discs were replaced with flat brake discs the random engagement of the pads and discs was again achieved, the DTV and vibrations associated with the DTV were eliminated. If a localized spot carries the load, you get wear and a pumping action at wheel frequency.

While not illustrated herein, it was found that if the slidable brake pad surfaces 50a, 54a, and 56a (FIG. 2) were not held in parallel relationship to the brake disc faces 38a and 40a, but were freely mounted or loosely mounted on the bridge, that the brake pads could tilt or cock and cause DTV and resultant vibration, as described above for a non-flat brake disc. Stated differently, the springs 71a and 71b were strong enough to hold the brake pads against a tilting that would shift their planar pad surfaces 50a, 54a and 56a from planes perpendicular to the rotational axis 9 and would bring a corner thereof into continual, localized rubbing contact with a brake disc in the off-brake position. Thus, the floating geometry for the brake discs and constraint of the brake pads and discs to achieve random contact at the off-brake position is an important aspect of the invention.

Figure 9:
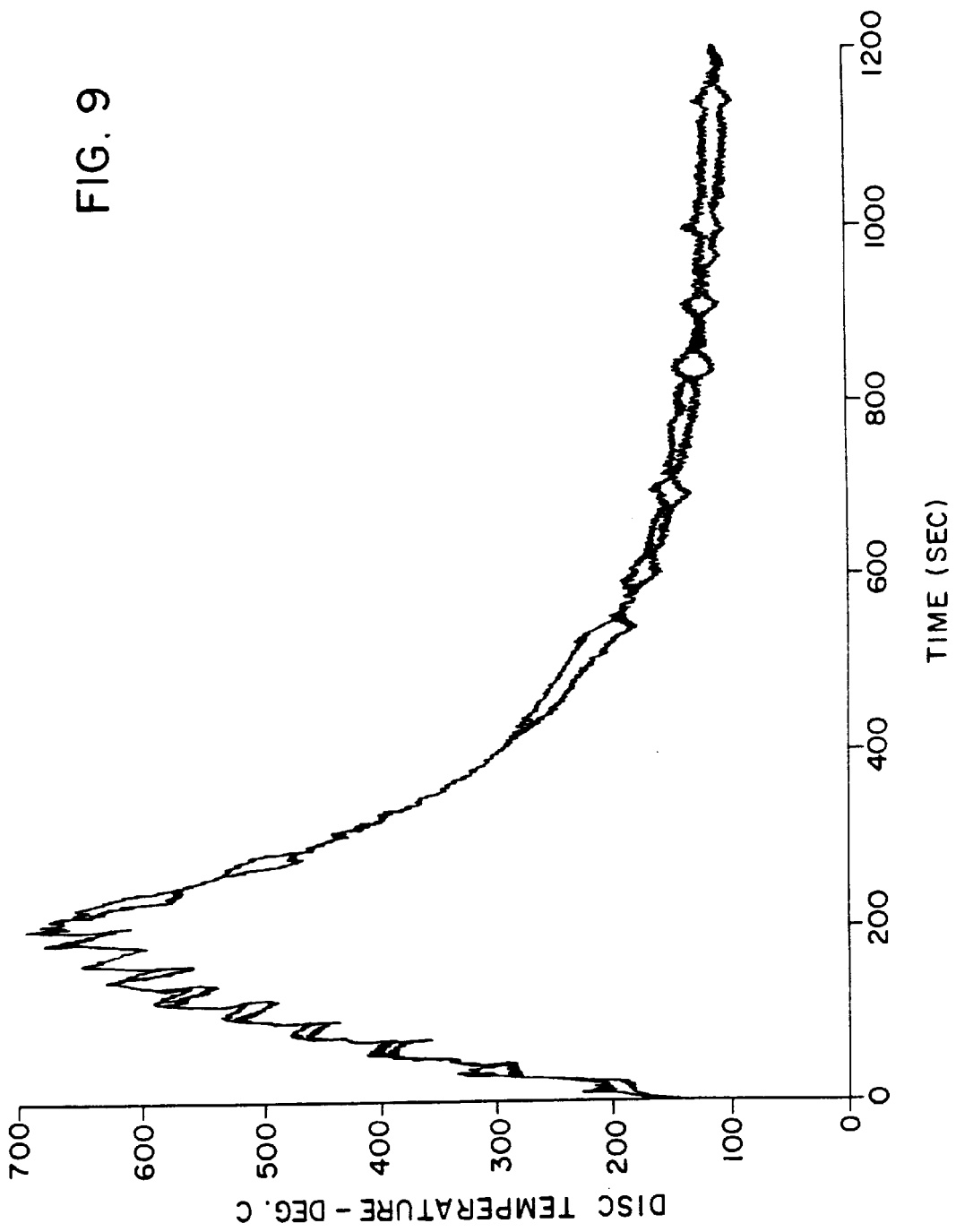
FIG. 9 shows curves for an AMS fade test of a standard fixed brake.
Figure 10:
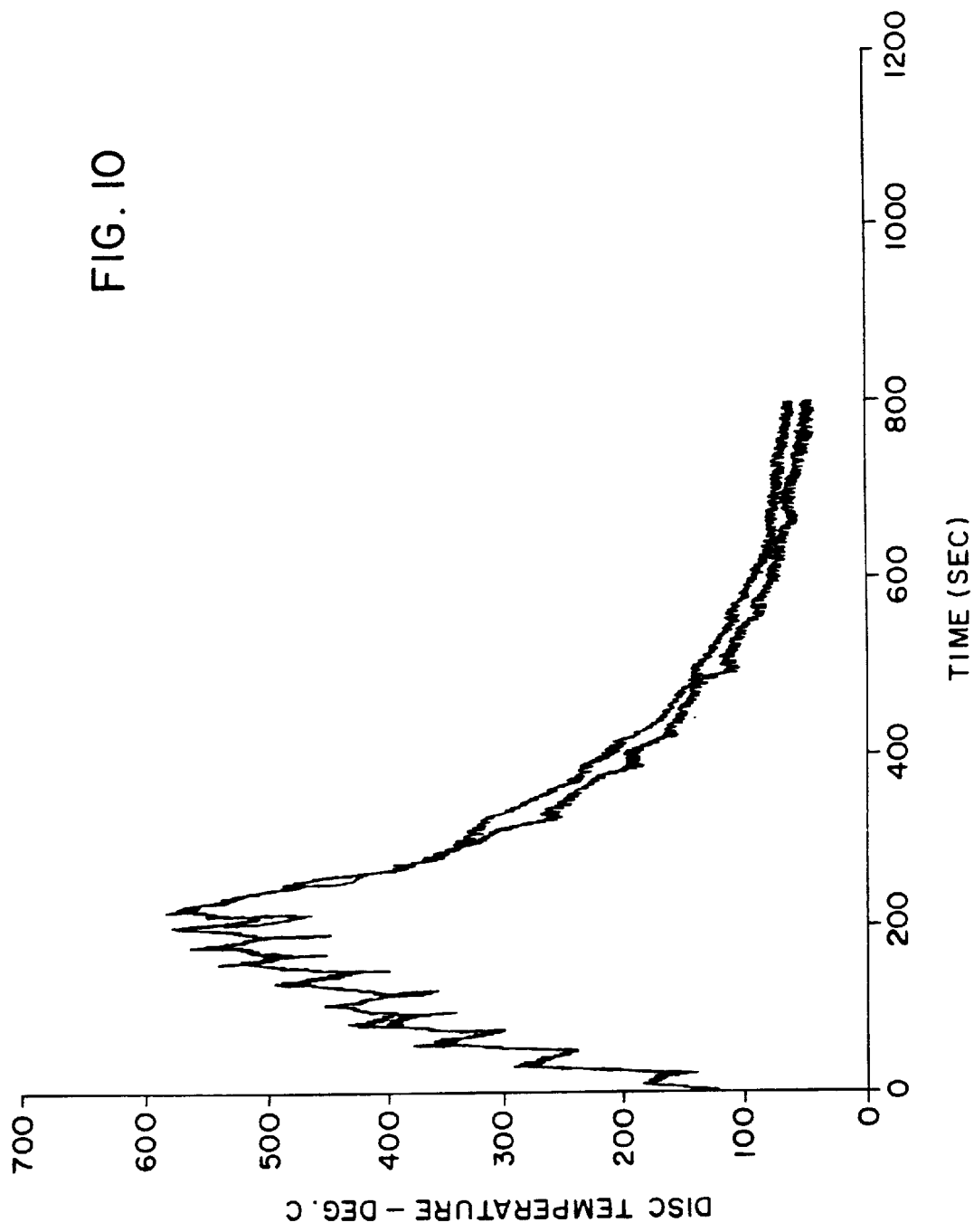
FIG. 10 shows the curves for an AMS fade test of a twin disc brake.

AMS fade tests were run to compare the performance of a slidable, twin disc brake assembly 10 versus the standard factory equipped fixed brake disc, and the results are shown in FIGS. 9 and 10. As seen in FIG. 9, there are ten peaks on the graph for each of the ten braking stops with the brakes cooling and showing a temperature drop of about 30° C. and a maximum disc temperature of about 700° C. which is the Judder range. In contrast, the twin slidable brake disc system had a maximum temperature of 580° C. (FIG. 10) or about 120° C. lower than the conventional disc brake. The temperature drop between braking events was about 80° C. compared to only a 30° C. temperature drop for conventional disc brake. Thus, the present invention passed the AMS fade test where the conventional brake being tested did not pass the AMS test.

In accordance with the present invention, the preferred drive connection 19 has the brake disc teeth 42 sized to fit the grooves 20 along both of the groove flanks 21 without using oversized grooves. This is in contrast to the prior art which used oversized spline grooves and small springs therein to engage the driving side flanks of the hub and disc;

but this prior art solution led to other problems like disc wobble on the hub. Preferably, the driving connection of the present invention is a very efficient one such as that akin to a pair of meshed gears where the contact is a line of contact across the engaged flanks 21 (FIG. 15A) rather than a small point of contact to provide lower unit pressures. Preferably, this line of contact is maintained whether the brake disc has a high or low temperature. The plastic deformation at the engaged spline surfaces keeps the engaged spline members clean from corrosion. The present invention eliminates the brinneling, dust generation, and squirming of the disc at high braking torque.

Figure 7:
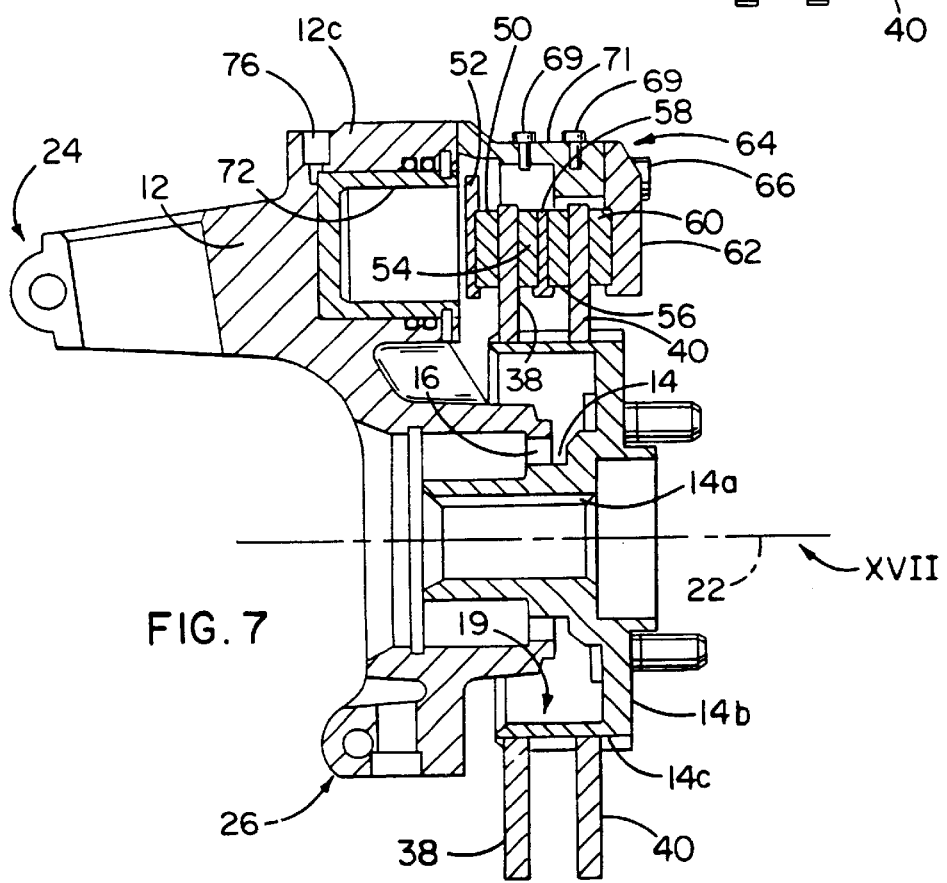
FIG. 7 is similar to FIG. 6 but shows the illustrative assembly in vertical cross section.

The hub 14 is an integral casting and, as is conventional, has a hollow cylindrical rearward projection 14a which has a splined interior, and an exterior, which provides a mounting for roller bearings 16 (FIG. 7). A splined projection of a constant velocity joint (not shown) at the end of a drive shaft is received within the projection so that the hub can be rotated on the bearings 16 by the drive shaft. The hub also has an annular disc-like portion 14b from which the portion projects rearwardly. The hub provides a mounting for the wheel (not shown) which is bolted against a forward surface of the portion by bolts received in holes 14d. The hub also has a hollow cylindrical rearward projection 14c of greater diameter than the portion. The portion projects from the outer edge of the portion 14b. The portion 14c has an outer surface provided with grooves 20 running parallel to the axis 22 about which the hub rotates. The grooves 20 are arranged in four equally circumferentially-spaced locations.

Figure 11:
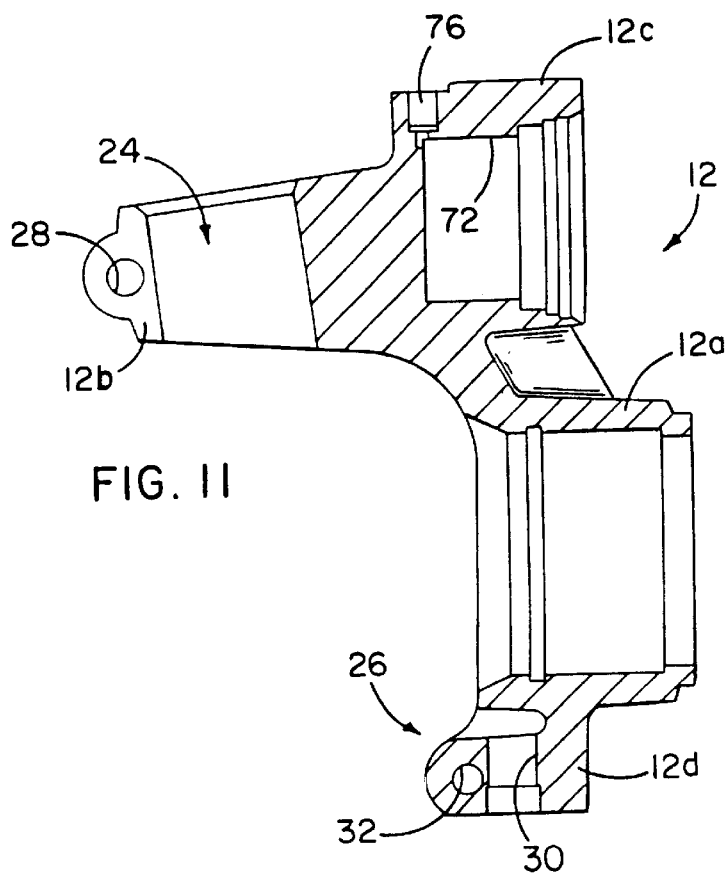
FIG. 11 is a vertical cross-sectional view taken through a suspension link of the illustrative assembly.

The suspension link 12 (FIG. 11) is an integral casting and comprises a hollow cylindrical portion 12a of conventional form, which provides a mounting for the bearings 16 so that the hub 14 rotates on the link. The link also comprises top 24 and bottom 26 mountings for supports of the link. The top mounting is provided by a portion 12b of the link which projects rearwardly from a portion 12c which projects upwardly from the portion 12a. The portion 12b is of conventional form and forms two semi-cylindrical arms (FIG. 5) which together form a clamp which can be tightened by a bolt (not shown) which extends through bores 28 in the arms and across a gap between them. A McPherson strut (not shown) can be clamped between the arms of the portion 12b so that the link can pivot about the longitudinal axis of the strut.

The bottom mounting 26 is provided by a portion 12d of the link 12, which projects downwardly from the portion 12a thereof. This portion 12d is of conventional form and has a vertical bore 30, to receive a pin of a ball joint (not shown), and two horizontal bores 32 in which bolts (not shown) can be received to connect the link to a tie bar (not shown).

The link 12 also comprises an arm 34 for connection to a track rod (not shown) of a steering system of the vehicle. This arm 34 is of conventional form and is provided by a portion 12e of the link 12, which projects sideways from the portion 12a thereof. The arm 34 comprises a vertical bore 36 through which the arm can be pivotally connected to the track rod. In order to steer the vehicle, the track rod is moved to cause the link to pivot on the joint 18 and the mountings 24 and 26.

Figure 5:
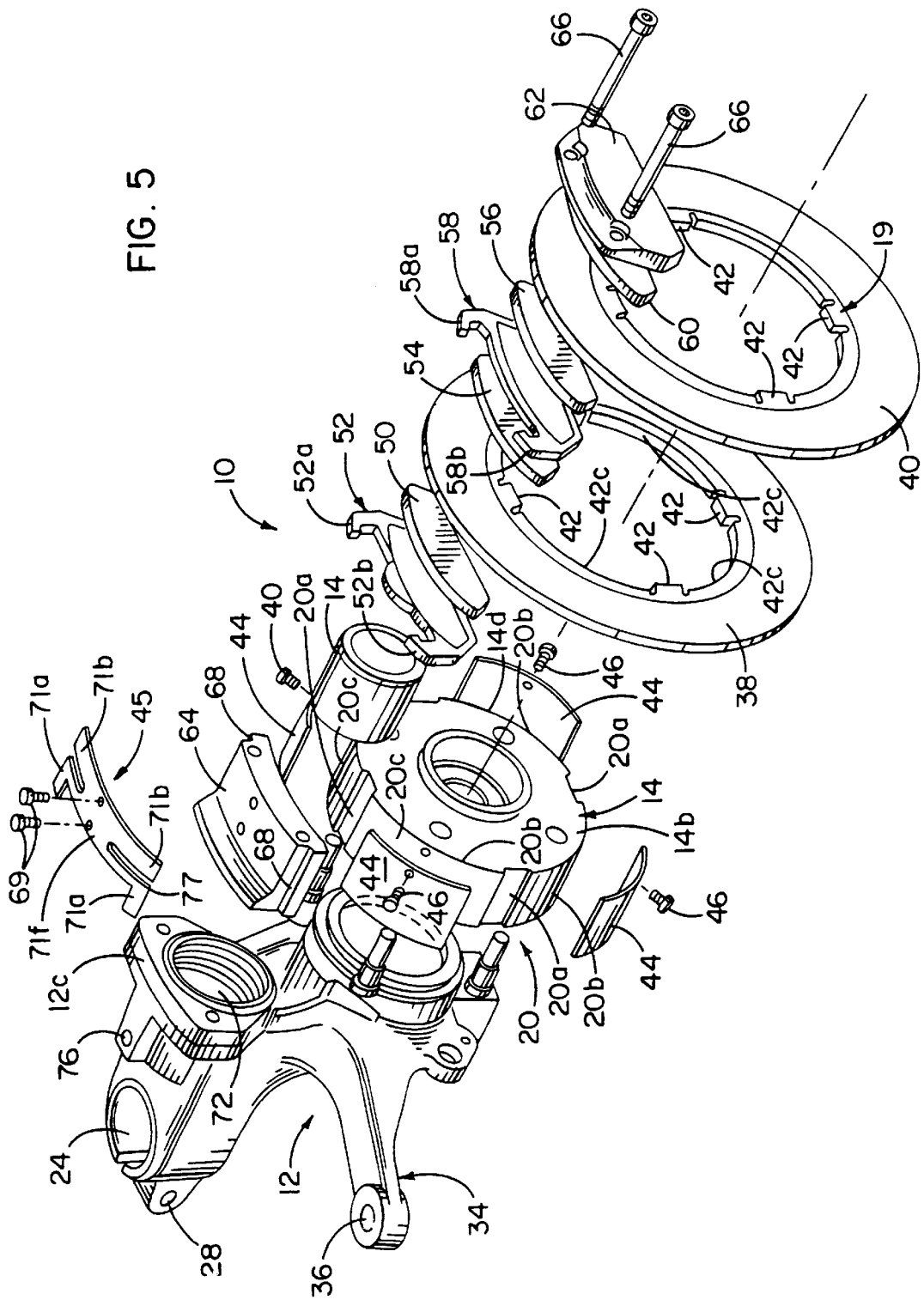
FIG. 5 is an exploded view of the illustrative assembly.
Figure 6:
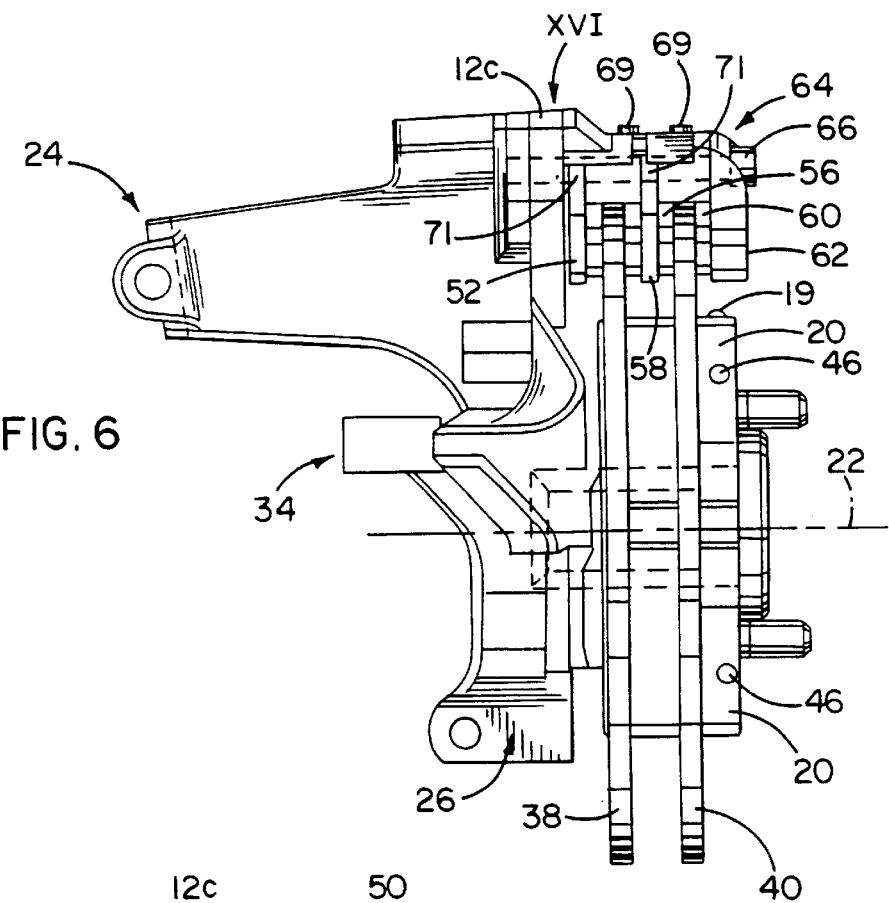
FIG. 6 is a side elevational view of the illustrative assembly.
Figure 15:
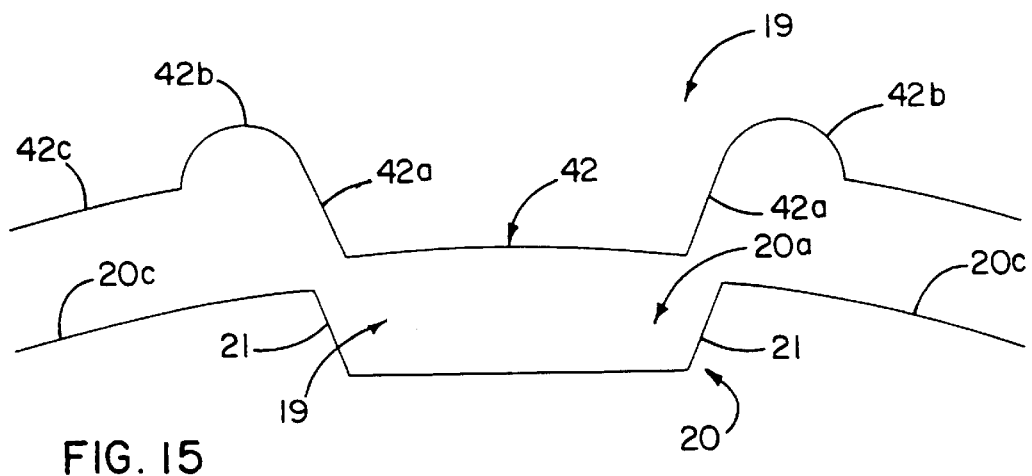
FIG. 15 is an enlarged, fragmentary and exploded view of the driving connection between a hub and slidable brake disc.
Figure 15A:
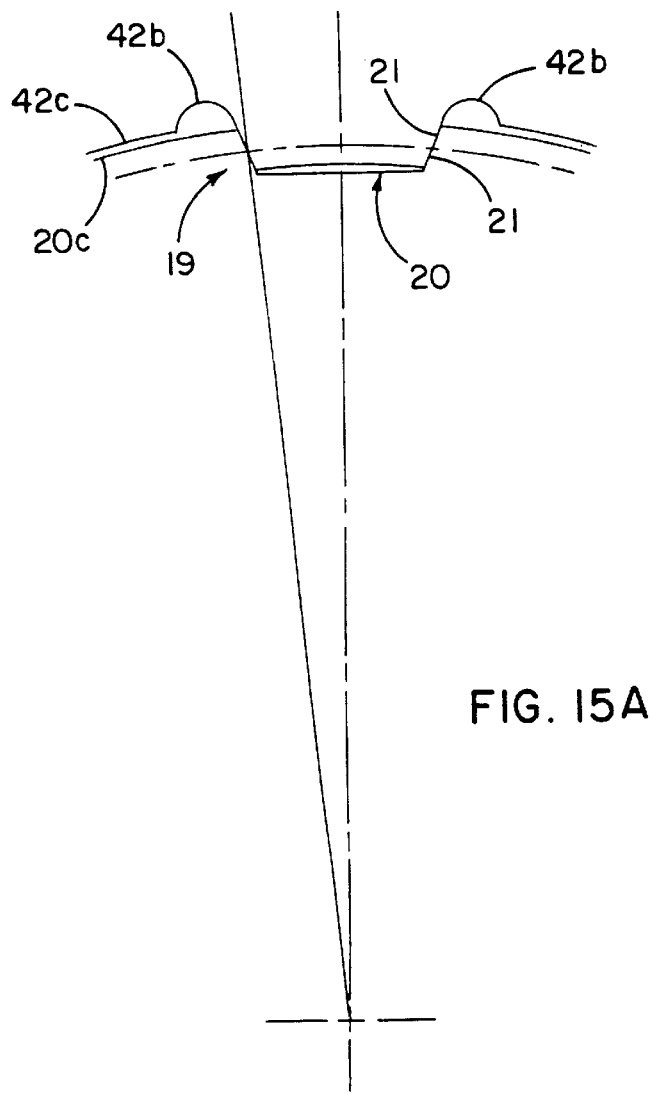
FIG. 15A is similar to FIG. 15 except that the driving connection is enlarged and meshed to drive the brake disc with rotation of the hub.

The illustrative assembly 10 also comprises the two brake discs 38 and 40, which are mounted for rotation with the hub 14. The two discs are identical to one another and are mounted for limited movement on the hub 14 in a direction generally parallel to the axis 22 about which the hub rotates. Specifically, each disc is in the form of a flat annular plate and has inwardly-projecting teeth 42. As best seen in FIGS. 5, 15 and 15A, it is preferred that the brake discs 38 and 40 each have a limited number of wide teeth, i.e., the illustrated four teeth 42 that mesh with the spline grooves 20a of splines 20 on the hub. The spline grooves 20a are four in number, in this instance, and have flanking walls 21 (FIG. 15) that match flanking walls 42a on brake disc teeth 42. The engaged flanks 21 and 42a have an angle A for their respective tooth flange angles. Manifestly, the number of teeth and splines may be varied. Because of large stresses generated on the thin teeth 42 on these relatively thin brake discs, there is a tendency of stress cracks to form, particularly after high temperature heating and cooling cycles and high stress cycles. To relieve such stress, there are provided large, curved, stress relief fillets or cut-outs 42b in the respective brake discs. Herein, as shown in FIGS. 15 and 15A, the stress relieving fillets are provided on each side of a tooth 42 and provide generally semi-cylindrical, cross-sectional openings on each side of each tooth, when the teeth are fitted into a spline grooves, as shown in FIG. 15A.

As best seen in FIG. 5, the four grooves 20 on the hub are relatively small compared to the projecting teeth 20b defined between each pair of adjacent grooves 20. These teeth 20b on the hub have large, arcuate surfaces 20c against which are laid the leaf springs 44. Thus, each leaf spring 44 has a large circumferential area contact with inner, arcuate surfaces 42c of the brake disc in the place between depending teeth 42 thereon.

Four leaf springs 44 are mounted on the hub 14 to provide resilient force applying means to apply radial forces between the hub and the discs 38 and 40. These radial forces prevent the discs from tilting on the hub, prevent rattling and control sliding of the discs along the hub. The resilience of the springs allows thermal expansion to be accommodated, as explained above. The springs are secured in a suitable manner, such as by screws 46 to the outer surface 20c of the hub portion 14c in the gaps between the spline grooves 20a. Each of the four springs engages both of the discs 38 and 40 in the areas between the teeth 42, giving a resilient four-point mounting for each disc. The discs can slide on the hub parallel to the axis 22 with the teeth sliding in the spline grooves 20a.

Figure 4:
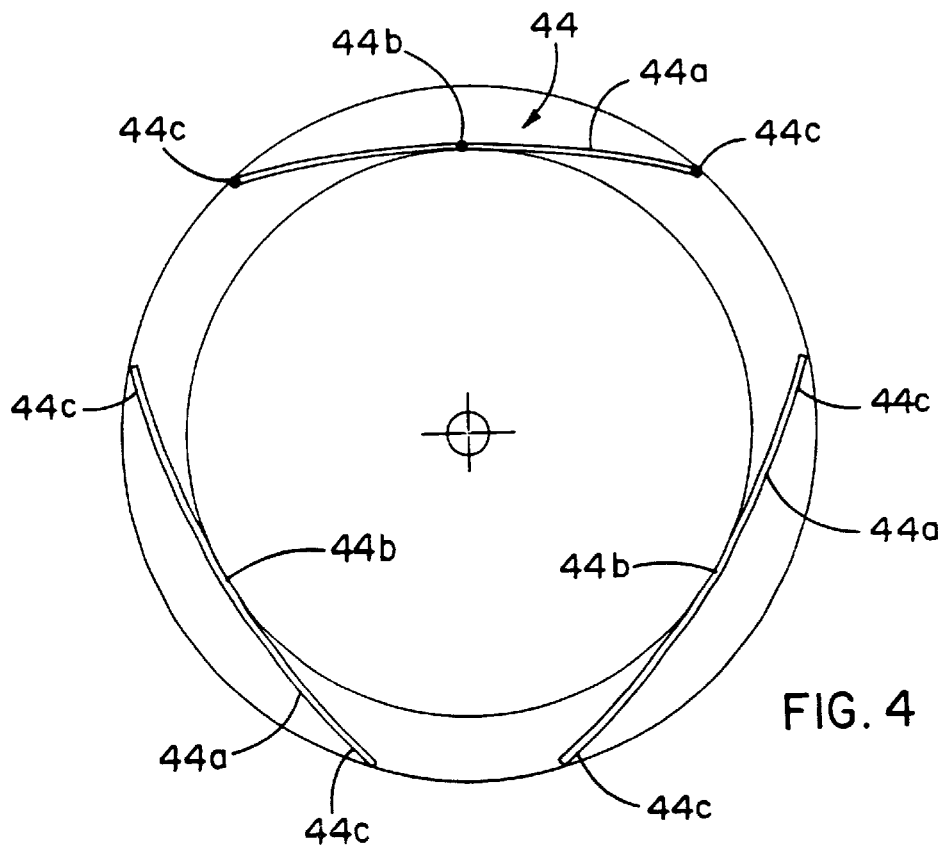
FIG. 4 is a diagrammatic view of three leaf spring constraining a brake disc on a hub.

As best seen in FIG. 4, the flat leaf spring 44 is engaged with and has a pressure line of contact with the hub at point 44b; and the outer ends of the spring 44c have been flexed downwardly to provide pressure line of contact engagement with the discs 38 and 40 at these bent spring ends. Only three springs 44 are shown in the diagrammatic illustration of FIG. 4 to illustrate the flexing of the springs 44; while in the embodiment of the invention described and illustrated in FIG. 5, four springs are used. In order to provide more lines of engagement between the disc and the hub, the spring 44x may be provided with ribs 44d therein, as shown in FIGS. 13 and 14. Also, it is preferred to separate the spring 44 into separate biasing portions 44h and 44i (FIG. 13) separated by a slot 44j each portion acting on an associated disc 38 or 40 to provide more individualized, independent pressure forces between the associated disc and the hub. The springs 44 are balanced in the force they apply to the brake discs 38 and 40 relative to the force which the springs 71a and 71b apply to the slidable brake pad carriers 52 and 58. Both the brake discs and the brake carriers are constrained against shifting along the hub and the bridge respectively, due to vibrations and inertial forces from the vehicle when it is traveling. Thus, it will be seen that the springs 44 allow the slidable brake discs to: float on the hub, hold the discs in a radial plane normal to the rotational axis, apply frictional forces that prevent squealing; apply frictional forces that aid in holding the discs in position while rotating in their off-brake positions; and permit axial forces from the force actuator to outwardly slide the discs to their braking position with engagement of the disc 40 with the stationary brake pad 60.

The illustrative assembly 10 also comprises the friction material pads arranged on opposite sides of each of the discs 38 and 40. These pads comprise the first pad 50 which is mounted on a backing plate 52 and is arranged to engage a side surface of the disc 38, pads 54 and 56, which are mounted on opposite sides of a backing plate 58 and are arranged, respectively, to engage the opposite side surface of the disc 38 and a facing side surface of the disc 40, and the pad 60 which is mounted on a backing plate 62 and is arranged to engage the opposite side surface of the disc 40. The backing plate is fixedly mounted on a guide member or bridge 64, which is, in turn, fixedly mounted on the portion 12c of the link 12. Specifically, two bolts 66 pass through bores through the portion 12c and the guide member 64, and have threaded ends which are received in threaded bores in the backing plate. The stationary guide member 64 provides two guidance surfaces 68 on which the backing plates 52 and 58 slide. The guidance surfaces 68 extend, parallel to the axis 22, along opposite sides of the member 64. The guidance surfaces may take other forms such as the shafts of the bolts 66.

Each guidance surface 68 receives a pair of concave, U-shaped projection or hooks of the pad carriers 52 and 58. As best seen in FIG. 3A, the slidable pad carrier 58 has hook-shaped projections 59 with inner sliding surfaces 59a, which are slidably supported on the upwardly-facing support surfaces 68 of the bridge 64. To assist in achieving the desired balance to allow the brake pad carriers 52 and 58 to be pushed apart from and by the brake discs 38 and 40, when they are shifting axially from their brakes-on to their brakes-off positions; and yet constrain the pad carriers and their brake pads from tilting, it is preferred to machine flat the inner sliding surfaces 59a on the carriers and the supporting surfaces 68 on the bridge. Flat machined surfaces on the carriers engaging flat machine surfaces on the bridge assures a more uniform, frictional, constraining force to retain the brake pad carriers against axial sliding from their off-brake positions. Also, the carriers will have broader, wider engagement with bridge supporting surfaces 68 to assist in preventing significant rocking or tilting on the bridge under vehicle inertial forces and/or vibrations when the vehicle is moving, as would cause localized rubbing contact in the off-brake condition.

If the slidable brake pad position is not controlled, the slidable brake pad may tilt to engage or to vibrate against the slidable brake disc and generate a random wear pattern on the disc causing DTV and vibration of the disc. The control of the slidable pad and disc is important in a very dynamic situation with the vehicle wheel carrying the slidable brake system over bumpy or smooth roads, cornering with brakes on, cornering with brakes off, with ABS system on, with an ABS system off, etc. On cornering, the hub deflects and moves the disc surface to engage the brake pad; and after cornering, the pad and disc separate as the brake recovers to its steady state of low residual torque at the off-brake position. In the embodiment of the invention, illustrated in FIGS. 2, 3 and 3A, the preferred force applicators comprise flat leaf springs 71a and 71b that have been bent from their flat planar condition to a bow configuration in which outer edges 71c and 71d of the springs abut top end surfaces 52a, 52b, 58a, 58b of the respective slidable brake carriers 52 and 58. The center portion of the leaf spring 71a is secured by a suitable fastener, such as screws 69 threaded through the spring and into the stationary bridge 64 at a central location on the top of the stationary bridge 64.

The force applicator 71 may take many forms, and it is herein illustrated in FIG. 3 as having the two separate leaf spring portions 71a and 71b, each of which is separately applied resilient, biasing forces to its associated brake pad holder 52 or 58. The leaf spring portions 71a and 71b are preferably connected by a short integral, central web 71f, which is located between a pair of facing, elongated slots 77 dividing the spring leaf into the two discrete spring force applicator sections. Thus, if one brake pad holder has high points thereon or other force mitigating or amplifying factors affecting it and its associated spring; the other brake pad holder and its associated spring should be isolated therefrom.

In the illustrated embodiment of the invention, the brake actuating force used to brake the vehicle is from a brake actuator which is in the form of a hydraulic piston and cylinder assembly 75, although it is contemplated that the actuating force could be from a brake by wire actuator. In a brake-by-wire system, an electric motor drive assembly would force the movable brake pad carriers 52 and 58 to carry the slidable brake pads into their respective braking positions and slide the brake discs axially along the hub 14 into their respective braking positions.

The illustrative force actuator system comprises a piston and cylinder assembly operable to urge the pads 50, 54, 56 and 60 into engagement with opposite side surfaces of the discs 38 and 40 to brake the hub 14 and hence, the wheel. The piston and cylinder assembly comprises a cylinder 72 which is defined by the portion 12c of the link 12. Thus, the cylinder is formed integrally with the remainder of the link. A brake-by-wire actuator such as an electric motor could be mounted in the cylinder 72 rather than the piston 74. Herein, the piston 74 of the assembly projects from the cylinder and engages the backing plate 52 on the opposite side thereof to the pad 50. The piston and cylinder assembly is operated by supplying hydraulic fluid under pressure to a bore 76 in the link portion 12c which communicates with the cylinder. Herein, the hydraulic pressure for operating the twin disc brake system was about 30 to 35 BAR which is one-half of the 70 BAR pressure of the conventional fixed disc brake on the other test vehicle. The piston had a face of about 200 mm in area. The piston moves out of the cylinder moving the backing plates 52 and 58 and the discs 38 and 40 until the disc 40 engages the pad 60, which does not move.

The hydraulic piston and cylinder assembly 75 includes a seal 79 (FIG. 18) which acts between the cylinder 72 and the piston 74 to prevent egress of hydraulic fluid from the cylinder. This seal is provided by an elastomeric sealing ring 81 (FIG. 18), which is mounted in an annular groove 83 formed in a cylinder wall 72a, the ring projecting from the groove to engage the piston. This sealing ring 81 also serves as an energy storing mechanism. Specifically, when the assembly is operated to move the piston outwardly of the cylinder to put the brake "on", the ring is compressed thereby storing energy therein. When the pressure of the hydraulic fluid in the cylinder is reduced, the ring releases the stored energy therein by moving the piston inwardly of the cylinder (away from the brake disc). Accordingly, the sealing ring has to engage the piston with a significant force. Movement of the piston away from the disc allows the movable pads 50, 54 and 56 of the brake to be moved away from the disc by forces exerted thereon by the rotating slidable brake discs 38 and 40 overcoming the force of the spring 71a and 71b; thereby putting the brake into a "brakes-off" condition.

The return of the piston 74 by the seal 81 reduces the off-brake torque because there is no significant force being applied by the piston to the brake carrier 52 and its brake shoe 50 relative to the facing side of the slidable brake disc 38. Conversely, the floating brake discs 38 and 40 are constrained and float on the hub 14 and will not shift the piston inwardly into the cylinder to displace hydraulic fluid, in the cylinder causing "knock-back" during cornering or other dynamic movements of the wheel assembly. The reduction of knock-back provides a better feel to applying the brakes with less fluid displacement, and eliminates the occasional long pedal displacement feel where substantial fall-back has occurred.

From the foregoing, it will be seen that the present invention provides a much smaller disc brake assembly without the very large caliper sliding and bolts as in the conventional, fixed disc brake. The caliper is large because it carries the cylinder and piston and the slidable bridge must withstand and transfer the large torque brake loads. The present invention is smaller because the cylinder can be integrated with the support and the bridge does not slide and carry the piston. Because of knock back and other problems, this large fixed brake is usually mounted at about 3:00 or 9:00 o'clock positions whereas in the present invention the brake is mounted at the top of the unit at the 12:00 o'clock position. The stiffness problem of the bridge with its deflection, e.g., 0.006 inch, is reduced by a factor of four when using four brake pads and one-half the hydraulic line pressure allowing a smaller and lighter weight brake assembly. The time of mounting and assembly of the brake, as well as repair or replacement, is enhanced because of the front bolting and the telescopic sliding of the brake discs and of the brake components versus the bolt from the rear or behind of the fixed brake bolts on which the caliper slides.

Figure 12:
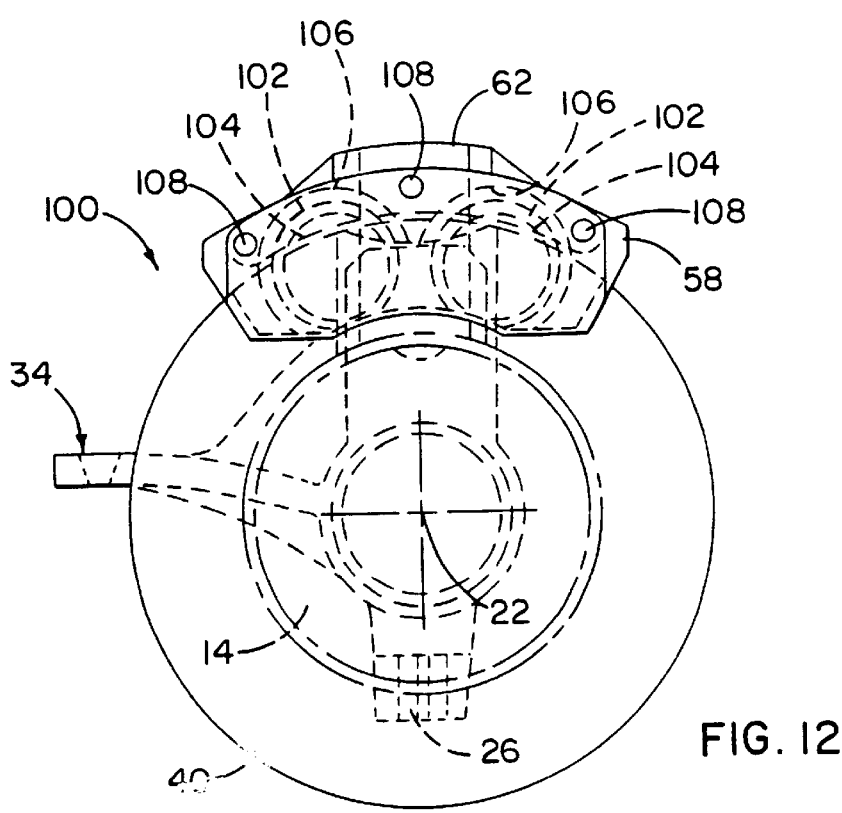
FIG. 12 is a view similar to FIG. 16, but of a modification of the illustrative assembly.

FIG. 12 is similar to FIG. 16 but illustrates a variation 100 of the illustrative assembly 10 in which like parts to those of the assembly 10 are given the same reference numerals and are not further described. The assembly 100 differs from the assembly 10 in that, instead of the cylinder 72, the portion 12c of the link 12 has two parallel cylinders 102 formed therein. In this case, each of the cylinders 102 has a smaller transverse cross-sectional area than the cylinder 72, but the total area of the cylinders 102 is greater. Each of the cylinders 102 has a piston 104 therein and the pistons 104 cooperate in pressing the backing plate 52. In order to accommodate the two piston and cylinder assemblies, the guide member 64 is modified to arch over the pistons, as shown at 106 and the bolts 66 are replaced by three bolts 108. The use of two piston and cylinder assemblies enables greater force to be applied for the same pressure in the cylinders (or the same force to be applied for lower pressure) and this force can, on average, be applied at a greater distance from the axis 22. If desired, the two cylinders can be of different diameters, e.g., with the leading cylinder in the normal direction of rotation, being of greater diameter.

What is claimed is:

1. A vehicle braking and suspension system comprising:
   a vehicle suspension having a suspension member;
   a wheel adapted to be carried by the vehicle suspension member;
   a disc brake and wheel support assembly having a supporting suspension member;
   a rotatable hub mounted on the suspension member for rotation about a central rotational axis through the hub and carrying the wheel for rotation about the rotational axis;
   a brake actuator for the disc brake mounted on the supporting suspension member;
   a stationary bridge on the suspension member and having slidable surfaces thereon;
   a brake disc mounted on the hub for braking the hub and wheel;
   a drive connection between the hub and the brake disc to rotate the brake disc with rotation of the hub and to decelerate the rotation of the hub when the disc is in the braking position;
   an outer, fixed brake pad mounted on the bridge for engaging one side of the brake disc;
   a slidable brake pad mounted on the slidable surfaces of the stationary bridge and slidable by the brake actuator to engage a friction surface thereon with the other side of the disc and to slide the brake disc axially along to the hub from an off-brake, residual torque position to a on-brake position in which the braking pads are engaging opposite sides of the brake disc to brake the disc, hub and wheel;
   a brake pad force applicator carried on the stationary bridge applying force to the brake pad to hold the brake pad in a plane parallel to the plane of the slidable brake disc;
   the drive connection between the disc and hub comprising intermeshed teeth; and
   the teeth on the brake disc being provided with stress relief fillets at the junctures of the teeth to the remainder of the brake disc.

2. A vehicle braking system in accordance with claim 1 wherein the intermeshed teeth comprises:
   teeth on the hub being several times larger in circumferential extent than the teeth on the brake disc.

3. A vehicle braking system in accordance with claim 2 wherein the leaf springs are disposed on the larger hub teeth and engage the brake disc and exert a radially outward force to aid in positioning the brake disc on the hub.

4. A vehicle braking system in accordance with claim 3 wherein four teeth on the hub and four teeth on the brake disc are intermeshed and comprise the intermeshed teeth.

5. A vehicle braking system in accordance with claim 1 wherein the brake pad force applicator comprises a resilient spring member mounted on the stationary bridge.

6. A vehicle braking system in accordance with claim 1 wherein sliding surfaces on the stationary bridge have sliding frictional engagement with sliding surfaces on the brake disc; and
   the brake pad force applicator comprises a resilient spring member mounted to overlie the brake pad and to apply a predetermined spring force to the brake pad to increase substantially the friction beyond that needed to prevent rattling of the brake pad on the bridge.

7. A vehicle braking system in accordance with claim 1 wherein the brake actuator for the disc brake comprises a hydraulic cylinder having a piston for forcing the slidable brake pad into the braking position;
   a compressible seal ring between the cylinder and piston exerts a return force on the piston when the braking fluid pressure is relieved at the no-load braking position; and
   the hydraulic cylinder being mounted at an upper vertical position on the suspension.

8. A vehicle braking system in accordance with claim 1 wherein:
   a second brake disc is mounted on the hub for axial sliding movement thereon; and a central brake pad carrier having opposed friction pads is slidably mounted on the stationary bridge to engage facing sides of the respective brake discs;

the force applicator holding the central pad carrier in an off-brake, residual torque position relative to the rotating brake discs.

9. A vehicle braking system in accordance with claim 1 wherein a friction force applicator is positioned between the brake disc and the hub to exert friction forces to assist the brake pads in positioning the brake discs at off-brake, residual load positions.

10. A vehicle braking system in accordance with claim 1 wherein intermeshed splines are formed on the brake disc and the hub to provide a positive drive connection therebetween; and spring members are positioned between the hub and the brake disc to apply frictional forces to resist free sliding of the brake disc on the hub as the brake disc is heated and expands and thereafter contracts when cooled.

11. A vehicle braking system in accordance with claim 1 wherein the two brake discs cool to less than 20° C. above ambient temperature when the ambient temperature is in the range of 10° C. to 20° C.

12. A vehicle braking system in accordance with claim 1 wherein the rotating brake disc and the brake pads and the brake pad force applicators position the brake discs for randomly engaging the brake pads at different locations, thereby preventing wear due to engagement at the same spot on the disc during each revolution as would cause disc thickness variation.

13. A vehicle braking and suspension system in accordance with claim 1 comprising:

springs positioned between the intermeshed teeth to apply radially directed forces to the brake disc to aid in positioning the brake disc on the hub.

14. A vehicle braking and suspension system comprising:

a vehicle suspension having a suspension member;

a wheel adapted to be carried by the vehicle suspension member;

a disc brake and wheel support assembly having a supporting suspension member;

a rotatable hub mounted on the suspension member for rotation about a central rotational axis through the hub and carrying the wheel for rotation about the rotational axis;

a brake actuator for the disc brake mounted on the supporting suspension member;

a stationary bridge on the suspension member and having slidable surfaces thereon;

a brake disc mounted on the hub for braking the hub and wheel;

a drive connection between the hub and the brake disc to rotate the brake disc with rotation of the hub and to decelerate the rotation of the hub when the disc is in the braking position;

an outer, fixed brake pad mounted on the bridge for engaging one side of the brake disc;

a slidable brake pad mounted on the slidable surfaces of the stationary bridge and slidable by the brake actuator to engage a friction surface thereon with the other side of the disc and to slide the brake disc axially along to the hub from an off-brake, residual torque position to a on-brake position in which the braking pads are engaging opposite sides of the brake disc to brake the disc, hub and wheel;

a brake pad force applicator carried on the stationary bridge applying force to the brake pad to hold the brake pad in a plane parallel to the plane of the slidable brake disc;

the drive connection between the disc and hub comprising intermeshed teeth;

grooves on the hub being substantially smaller than grooves on the brake disc;

the projecting teeth on the hub being substantially larger than the projecting teeth on the brake disc; and the respective grooves on the disc and hub have flanking surfaces having substantially matching angles.

15. A vehicle braking and suspension system in accordance with claim 14 comprising:

the teeth on the hub have large circumferentially extending surfaces; and leaf springs are disposed on the large circumferentially extending surfaces of the teeth on the hub and engaging surfaces on the grooves in the brake disc and exerting radially outward directed forces on the brake disc to aid in positioning the same on the hub.

16. A vehicle braking system in accordance with claim 14 wherein the intermeshed teeth comprise:

four teeth on the hub and four teeth on the brake disc.

* * * * *